United States Patent [19]

Demarthe et al.

[11] 4,166,737

[45] Sep. 4, 1979

[54] METHOD FOR DISSOLVING THE NON-FERROUS METALS CONTAINED IN OXYGENATED COMPOUNDS

[75] Inventors: Jean-Michel Demarthé, Viroflay; André Georgeaux, Rambouillet, both of France

[73] Assignee: Minemet Recherche, Trappes, France

[21] Appl. No.: 858,196

[22] Filed: Dec. 7, 1977

[30] Foreign Application Priority Data

Dec. 9, 1976 [FR] France ................................. 76 37053

[51] Int. Cl.$^2$ ...................... C22B 13/04; C22B 19/00; C22B 15/08; C22B 23/04
[52] U.S. Cl. ........................................ 75/104; 75/109; 75/114; 75/117; 75/119; 75/120; 423/98
[58] Field of Search ................. 75/104, 120, 109, 114; 423/98; 75/117, 119

[56] References Cited

U.S. PATENT DOCUMENTS

| | | | |
|---|---|---|---|
| 937,104 | 10/1909 | Elliott et al. | 75/104 |
| 981,451 | 1/1911 | McKechnie et al. | 75/104 X |
| 1,390,603 | 9/1921 | Christensen | 75/120 X |
| 2,021,896 | 11/1935 | Platten | 75/120 X |
| 3,652,264 | 3/1972 | Bodson | 75/108 X |
| 3,929,597 | 12/1975 | Cottam et al. | 75/109 X |
| 3,961,941 | 6/1976 | Baker et al. | 75/101 R |
| 3,973,949 | 8/1976 | Goens et al. | 75/114 X |
| 4,053,305 | 10/1977 | Smyres et al. | 75/120 X |

FOREIGN PATENT DOCUMENTS

| | | |
|---|---|---|
| 52035 | 10/1889 | Fed. Rep. of Germany . |
| 494515 | 9/1919 | France . |
| 1161108 | 10/1958 | France . |
| 1484121 | 8/1977 | United Kingdom . |

*Primary Examiner*—G. Ozaki
*Attorney, Agent, or Firm*—Fleit & Jacobson

[57] ABSTRACT

A method for the dissolution of non-ferrous metals contained in oxygenated compounds in which the oxygenated compounds are subjected to the action of a ferrous chloride solution and a gas containing oxygen is mixed with the solution.

11 Claims, No Drawings

METHOD FOR DISSOLVING THE NON-FERROUS METALS CONTAINED IN OXYGENATED COMPOUNDS

This invention is concerned with a hydro-metallurgical method for the selective dissolution of mixtures of oxygenated metal compounds. More particularly, this invention has reference to the selective dissolution of certain non-ferrous metals that are present in said mixtures of oxygenated compounds.

In the course of the application of methods that lead from the ore to the pure metal, the metallurgist often has to process mixtures of oxygenated metal compounds. These mixtures may be encountered at any stage of working the metal, from the ore itself that may be a mixture of oxides, to the residues from the refinement of the metals. We may cite, by way of examples of such mixtures, the products of the roasting of pyrites, the products of the roasting of nickel mattes, and the basic nickel carbonates ("B.N.C.") that result from a first reduction of the mineral followed by leaching lixiviation with ammonia.

In order further to pursue the process of working the metal(s), it is necessary to separate them from one another and, in particular, to separate them from iron which is very often present in the ores of non-ferrous metals and is, for that reason, found again during the first stages of the purification of those metals in various preparations.

In order to carry out that separation, one generally proceeds to dissolve the metals to be recovered. This dissolving process is performed, most frequently, by means of hydrochloric acid and sulphuric acid. However, these dissolutions are not selective and amounts of iron that are far from negligible are found in the final solutions.

This is the reason why one of the objects of the present invention comprises a method of selective dissolution of oxides of non-ferrous metals, a method that makes it possible to separate said metals from iron, from manganese, and from silica.

More particularly, one object of the present invention comprises providing a method for the selective dissolution of the oxides of lead and zinc that makes it possible to separate them from arsenical compounds.

Another object of the present invention comprises providing a method of dissolving copper oxides, a method that makes it possible to separate them from lead oxide.

In accordance with the invention, these objects, and others that will be disclosed hereinafter, are achieved by means of a method of dissolving the non-ferrous metals contained in oxygenated compounds, said method being characterized by the fact that said oxygenated compounds are subjected to the action of a solution of iron chloride with which one mixes or bubbles through a gas that contains oxygen.

By the term "oxygenated compound," we include a large number of compounds, such as the oxides proper, the hydroxides, the carbonates, the basic carbonates, and indeed certain silicates and, in a general way, the salts of weak oxygenated acids. It is also appropriate to indicate that it is possible, by the use of this technique, to dissolve lead sulfate. The term "oxygenated compound" covers also mixtures of the preceding compounds.

The gas containing the oxygen may be any mixture of oxygen and an inert gas. It may also be pure oxygen, but by preference, air will be used. The iron chloride may either be present in the aqueous phase being used to reduce the oxygenated compound to "pulp" or it may be added in the course of the reaction.

The composition of the aqueous phase in which the oxygenated compound is reduced to pulp plays an important part in the selectivity of the dissolution. Thus, high concentrations in complex media, such as the chloride ions, makes it possible to render certain metals more easily soluble. For example, strong concentrations of chloride ions (i.e., concentrations that exceed three equivalent grams per liter) facilitate the dissolution of lead. The additional chloride ions may be introduced in the form of a chloride of an alkali or alkaline earth metal. On the other hand, the presence of certain ions may impede the dissolution of certain non-ferrous metals. For example, the presence of sulfate ions in high concentrations impedes the dissolution of lead ions.

Even though it is possible to work at widely varying temperatures, it is preferable to work at a temperature within the range of 60° C. and the boiling temperature of the mixture. By preference, the pH of the solution at the beginning of the reaction lies between 2 and 4.

In the course of the reaction, ferrous iron is oxidized in geothite, while the non-ferrous metals go into solution. The reaction can be written in the following form, using zinc as an example:

$$2ZnO + 2FeCl_2 + \tfrac{1}{2}O_2 + H_2O \rightarrow 2ZnCl_2 + 2Fe(O)OH$$
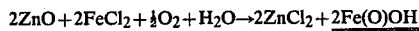

In most cases, the reaction is rapid and easy, and results in an easily filterable precipitate.

In order to prevent the precipitation of ferric hydroxides that are difficult to filter out, the presence of ferric ions in the ferrous chloride solution should be avoided as much as possible.

We want to stress that, in the method in accordance with the invention, arsenic is converted into non-soluble ferric arsenates. Due to this fact, the rate of dissolution of arsenic is very low and lies around 0.2%.

The stage of the dissolution of the non-ferrous metals may advantageously be followed by a cementation of the non-ferrous metals that are less electro-positive than iron. This cementation is achieved by bringing the solution into contact with iron in any suitable form, such as, for example, in the form of a ground-up cast, of scrap iron, or of previously reduced iron ore when the resulting solution is recycled advantageously to the dissolving process. On the other hand, the cementation may be replaced by an electrolysis with an anode that is soluble in iron, and in which the non-ferrous metals are deposited at the cathode.

It is necessary also to note that the method of the invention is of interest not only for the dissolution of non-ferrous metals but also offers an outlet for the ferrous salts the ejection of which are apt, when they are in a soluble form, to pollute the streams. As a matter of fact, this method converts these ferrous salts into oxides that can easily be stored and may even be rendered marketable, eventually.

The method in accordance with this invention has, moreover, a very great flexibility. It makes it possible not only to treat arsenical and bismuthic ores and concentrates, but also to treat the zinc and lead wastes of factories. In this way, it solves problems of the environment and of waste which have existed a long time. This flexibility of use is achieved by simple modifications of the reagent.

Lastly, this method complements advantageously the one described in U.S. application Ser. No. 577,772, filed May 15, 1975. As a matter of fact, this U.S. application is concerned with the dissolution of metals contained in sulfurated ores and concentrates of non-ferrous metals. That process of dissolution may be carried out in the same installations as the ones that are required for the application of the method that constitutes the object of this invention. The two methods may, therefore, be used conjointly or concurrently without involving any prohibitive capital investment. That is of importance inasmuch as many deposits contain, at the same time, sulfurated and oxidized ores in which case the latter ones come into existence by the oxidation of the first ones.

In addition, it is possible at the same time to attack oxygenated and sulfurated compounds when the ferrous chloride solution contains copper chloride. The acidity that is freed by the precipitation of the ferric compounds will then be used, on the one hand, to dissolve the oxygenated compounds and, on the other hand, to regenerate the cuprous chloride in accordance with a reaction that may be written overall as follows:

$$4CuCl + 2FeCl_2 + 3/2 O_2 + H_2O \rightarrow 4CuCl_2 + 2FeO(OH)$$
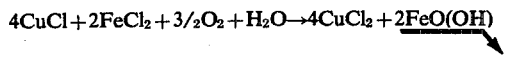

The cupric chloride is then reduced to cuprous by reacting with the sulfides in the ores.

Lastly, it is appropriate to indicate that the solutions of lead chloride, zinc chloride, and copper chloride which are obtained in accordance with the method of this invention can advantageously be treated in accordance with the techniques disclosed in U.S. application Ser. No. 677,515, filed Apr. 16, 1976. Inasmuch as the solutions of nickel chloride and cobalt chloride are concerned, one may advantageously have recourse to the techniques described in the French Pat. Nos. 2,217,925 and 2,234,756.

The following non-limiting examples have the purpose of placing the experts in a position where they can easily determine the working conditions which are used appropriately in each special case.

The examples 1 to 3 are concerned with the dissolution of a lead concentrate that has been prepared from the ore of Angouran (Iran), the composition by weight of which is as follows:

| Lead | 55.84% | Sulphur | 1% |
|---|---|---|---|
| Zinc | 8.54 | Sulphurous anhydride | 0.57 |
| Iron | 1.22 | Free Carbon | 0.57 |
| Silver | 0.015 | Carbonate | 10.1 |
| Arsenic | 5.58 | Chlorine | 0.45 |
| Antimony | 0.02 | Water | 0.4 |
| Bismuth | 0.002 | Oxygen and undetermined substances | 11.8 |
| Silica SiO₂ | 1.85 | Calcium oxide | 0.3 |

The principal phases found in this concentrate are as follows:
Cerussite: $PbCO_3$
Smithsonite: $ZnCO_3$
Mimetite: $Pb_5(AsO_4)_3Cl$

EXAMPLE 1

Attack on the Angouran concentrate by the concomitant action of ferrous chloride and of oxygen.

The overall reaction of said attack on the lead oxide may be written:

$$6FeCl_2 + 6PbO + 3H_2O + 3/2 O_2 \rightarrow 6Fe(O)OH + 6PbCl_2$$
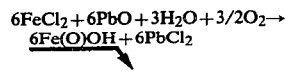

The attack of the lead carbonate may be written:

$$6FeCl_2 + 6PbCO_3 + 3H_2O + 3/2 O_2 \rightarrow 6Fe(O)OH + 6PbCl_2 + 6CO_2$$
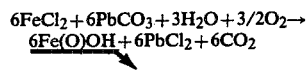

Other reactions may take place, for example:

$$2Pb_5(AsO_4)_3Cl + 9FeCl_2 + 3O_2 \rightarrow 6FeAsO_4 + 3Fe(O)OH + 10PbCl_2$$
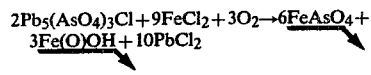

In a reactor of 500 ml with a rising refrigerant, and the inner part of which consists of a porous diaphragm, the temperature is brought to 85° C., then, a solution of $FeCl_2$ containing some 100 g/l of iron is added. One introduces, once only, 22.5 g of lead concentrate from the Angouran (Iran) mine and containing 55.8% per weight of lead. Oxygen is flowed at a rate of 7 liters per hour through the porous diaphragm. The speed of the appearance of the lead is measured as a function of time. The results of these determinations are as follows:

| time in hours | Pg g/l |
|---|---|
| 0 | 0 |
| 0.30 | 7.8 |
| 1.00 | 8.8 |
| 2.00 | 10.5 |
| 3.00 | 10.0 |
| 5.00 | 11.0 |

The operation is halted at the end of 7 hours. The residual solid is collected by filtration and washed with a sodium chloride brine containing 270 g/l of NaCl so as to extract the lead chloride that may be found there. Next, the solid is dried at 100° C. and then analyzed. In this way, one collects 37 g of residue containing 3.45% of lead. Accordingly, the yield of the dissolution of the lead amounts to 88.8%.

This result is altogether exceptional when taking into account that the optimal conditions for the dissolution of lead chloride were not fulfilled.

EXAMPLE 2

Attack on the concentrate from Angouran by $FeCl_2$ in the presence of air.

In one liter of a solution that contains 250 g/l of sodium chloride and 20 g/l of iron in the form of ferrous chloride, the attack is made, at a temperature of 80° C., on 71 g of the concentrate while, at the same time, air is being introduced at the rate of 35 l/h which represents 7 times the stoichiometric quantity ("Q.S."), in relation to the quantity of lead and zinc to be dissolved. The pH is equal to 2.6.

Following filtration, we obtain, on the one hand, a solution that is designated as the "final solution" in the following Table I and, on the other hand, a first residue that will be subjected to washing with hot water.

After cooling, and filtration of the solution resulting from the washing, we obtain lead chloride crystals designated by "1st solution after washing with $PbCl_2$" in the Table I, as well as a solution called "Solution after washing with hot $H_2O$."

We begin once more, the operation of washing, viz. with the residue obtained in that way, but in doing so, the hot water is replaced by a sodium chloride brine that is analogous to the one of Example 1 above. In this way, we obtain, respectively, the products designated in the Table I as "2nd solution after washing with $PbCl_2$" and "Solution after washing with NaCl 270 g/l."

The results of the chemical analysis of the various products examined in this way are shown in the Table I.

other hand, we obtain a solution that floats on the surface and contains, essentially, 13.8 g/l of lead and 6.4 g/l of zinc. This solution has been designated as "Final solution 1" in the Table II.

The residue of that 1st attack ("Dry residue 1" of the Table II) that contains the iron oxide which has been precipitated therein is washed with water so as to result in a solution the analysis of which appears in the Table II under the heading of "Washed Solution 1." The residue will then be "re-pulped" once more in a fresh solution of sodium chloride of 250 g/l.

The mixture is brought to a temperature of 80° C.,

Table I

| Designation | Weight in g or volume in ml | Pb % | Pb g | Pb Eq-g | Fe % | Fe g | Fe Eq-g | Zn % | Zn g | Zn Eq-g | As % | As g | Ag % | Ag g |
|---|---|---|---|---|---|---|---|---|---|---|---|---|---|---|
| Initial solution | 1000 | | | | 21 | 21 | 0.75 | | | | | | | |
| Concentration | 71 | 55.8 | 40 | 0.38 | 1.22 | 0.86 | | 8.54 | 6 | 0.18 | 5.58 | 3.96 | 0.015 | 0.01 |
| Total input | | | 40 | 0.38 | | 21.8 | 0.75 | | 6 | 0.18 | | 3.96 | | 0.01 |
| Final solution | 900 | 9.32 | 8.4 | 0.08 | 9.18 | 8.26 | 0.29 | 5 | 4.5 | 0.14 | 0.0074 | 0.0066 | 0.005 | 0.0045 |
| Solution after washing with hot $H_2O$ | 680 | 0.75 | 0.51 | | | | | | | | | | | |
| Solution after washing with NaCl 270g/l | 450 | 12.9 | 5.8 | 0.056 | | | | | | | | | | |
| 1st solution after washing with $Cl_2$ | 3 | 72.38 | 2.17 | 0.02 | 0.04 | | | | | | | | | |
| 2nd solution after washing with $PbCl_2$ | 10 | 72.38 | 7.23 | 0.07 | 0.04 | 0.04 | | | | | | | | |
| Residues | 45 | 30.5 | 13.72 | 0.13 | 23.75 | 10.68 | 0.38 | 1.5 | 0.67 | 0.02 | 6.66 | 2.99 | 0.007 | 0.0031 |
| Total Output | | 37.83 | 57.83 | 0.356 | | 18.94 | 0.67 | | 5.17 | 0.16 | | 3 | | 0.0076 |
| Yield in % | | | 63.7 | | | | | | 87 | | | 0.3 | | 59 |

EXAMPLE 3

In a reactor the base of which has been provided with a porous diaphragm, 1,000 ml of a ferrous chloride solution containing 20 g/l of iron and 250 g/l of sodium chloride are maintained at a temperature of 80° C. 71 g of oxidized lead ore from Angouran (Iran), and the composition of which is identical with that of Example 1, are introduced.

Over a period of 8 hours, atmospheric air is injected into this mixture. During this time, a gradual disappearance of the $Fe^{++}$-ion in solution is observed and the appearance of lead and zinc is observed.

At the end of this first attack, we collect, by means of filtration, 840 ml of a solution which will be subjected to a cooling process. In this way, we obtain 19.5 g of lead chloride crystals containing 73.8% of lead, the detailed analysis of which is shown in the following Table II under the heading of "Final $PbCl_2$ solution 1". On the and hydrochloric acid of 12 times the normal strength is injected, in such a way that a pH equal to 2 is maintained. In this way, 4.93 ml of that acid will be used.

The whole will then be filtered. In this way, we collect, on the one hand, 950 ml of a solution ("Final solution 2" of the Table II) containing 7.9 g/l of lead, 0.26 g/l of zinc, 0.22 g/l of iron, and 0.69 g/l of arsenic, and, on the other hand, 31 g of a residue ("Dry residue 2" of the Table II) which is washed by water, that resulting in "Washed solution 2" of the Table II, and which contains 5.4% of lead, 1.46% of zinc, and 37% of iron.

This test of an attack in two phases enables us to state:
that the overall yield of the dissolution amounts to 96% for lead and to 92.6% for zinc;
that the attack with a controlled pH has made it possible to terminate the attack on the lead and zinc without dissolving again the iron that has been precipitated earlier.

TABLE II

| Designation | Weight in g Volume in ml | Pb % | Pb g | Pb Eq-g | Zn % | Zn g | Zn Eq-g | Fe % | Fe g | Fe Eq-g |
|---|---|---|---|---|---|---|---|---|---|---|
| Initial Solution | 1000 | | | | | | | 20.8 | 20.8 | 0.74 |
| Initial Product | 71 | 57.25 | 40.6 | 0.39 | 8.6 | 6.1 | 0.18 | 1.18 | 0.84 | 0.03 |
| Total Input | | | 40.6 | | | 6.1 | | | 21.6 | |
| Final Solution 1 | 840 | 13.8 | 11.6 | 0.11 | 6.4 | 5.37 | | 8.9 | 7.5 | 0.26 |
| Final Solution 2 | 950 | 7.9 | 7.5 | 0.07 | 0.26 | 0.24 | | 0.22 | 0.2 | |
| Final $PbCl_2$ Solution 1 | 19.5 | 73.84 | 14.4 | 0.14 | | | | 50g/t | | |
| Washed Solution 1 | 350 | 1.57 | 0.55 | | 0.74 | 0.26 | | 1.01 | 0.35 | |
| Washed Solution 2 | 255 | 0.46 | 0.1 | | 0.05 | 0.01 | | 0.08 | 0.02 | |

TABLE II-continued

| Designation | Weight in g Volume in ml | Pb % | g | Eq-g | Zn % | g | Eq-g | Fe % | g | Eq-g |
|---|---|---|---|---|---|---|---|---|---|---|
| Dry Residue 1 | 42 | 24.6 | 10.3 | 0.10 | 1.82 | 0.76 | 0.02 | 28.9 | 12.1 | 0.43 |
| Dry Residue 2 | 31 | 5.4 | 1.6 | 0.02 | 1.46 | 0.45 | 0.014 | 37 | 11.5 | 0.41 |
| Total Output | | | 35.7 | | | 6.24 | | | 19.57 | |

EXAMPLE 4

In this Example, the attacked compound is a residue from a zinc and lead plant located at Crotone (Italy). This compound which is called "Oliver filter cake" contains, essentially, the following phases:

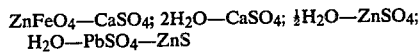

$$ZnFeO_4-CaSO_4; 2H_2O-CaSO_4; \tfrac{1}{2}H_2O-ZnSO_4;$$
$$H_2O-PbSO_4-ZnS$$

We pulp 126 g of residue in one liter of brine containing 250 g/l of sodium chloride and 40 g/l of ferrous chloride. The temperature is raised to 80° C. and maintained there, while one causes air to mix with (bubble in) the pulp at a rate of 32 liters per hour, for a period of 6 hours; the final pH of the pulp is 1.8.

Following filration, the residue obtained is washed with hot water.

The results of the attack are summarized in the following Table III where the headings are analogous to those of the Table I, since all other things are equal.

TABLE III

| Designation | Weight in g Volume in ml | Zn % | g | Eq-g | Pb % | g | Eq-g | Fe % | g | Eq-g |
|---|---|---|---|---|---|---|---|---|---|---|
| Initial Solution | 1000 | | | | | | | 41.8 | 41.8 | 1.49 |
| Initial Product | 126 | 11.9 | 15 | 0.45 | 7.63 | 9.6 | 0.09 | 19 | 23.94 | 0.85 |
| Total Input | | | 15 | | | 9.6 | 0.09 | | 65.74 | 2.34 |
| Final Solution | 900 | 1.08 | 0.97 | 0.03 | 7.12 | 6.4 | 0.06 | 32.7 | 29.4 | 1.05 |
| Washed Solution | 220 | | | | 0.82 | 0.18 | | | | |
| Final PbCl$_2$ Solution | 0.5 | | | | 74.5 | 0.4 | 0.004 | | | |
| Residues | 118 | 49.5 | 11.21 | 0.30 | 1.12 | 1.32 | 0.012 | 27.63 | 32.60 | 1.16 |
| Total Output | | | 12.18 | 0.33 | | 8.3 | 0.076 | | 62.0 | 2.21 |

It may be useful to compare that Table to the one of Example 4 of French Pat. No. 2,351,178. One may note, in particular, how much better the dissolution yield of lead turns out to be. The dissolution yield of zinc increases slightly as to its absolute value and considerably as to its relative value. It is also worthwhile to note that the pH is particularly low for the pH of a Goethite precipitation.

EXAMPLE 5

Attack on the nickel carbonate.

We introduce an amount of hydrated nickel carbonate corresponding to a nickel content of 27.5 g in a reactor that contains one liter of ferrous chloride solution of 23.7 g/l. With the reaction mixture which is heated to 95° C., we cause oxygen to mix at a rate of 0.8 standard liter ("liter normal") per hour for a period of 6 hours. The results of the attack are summarized in the following Table:

| Product resulting from the attack | Weights or volumes | Final contents of Ni | Fe |
|---|---|---|---|
| Filtrate | 0.951 | 20.3g/l | 0.13g/l |
| Wash water | 0.451 | 7.4g/l | 3.3 g/l |
| Residue | 42g | 10.6% | 55.8% |

These results correspond to a nickel yield of the order of 90% (in relation to the initial quantity of ferrous chloride).

We claim:

1. A method for the dissolution of nonferrous metals selected from the group consisting of copper, lead, zinc, and nickel contained in oxygenated compounds comprising subjecting said oxygenated compounds to the action of a ferrous chloride solution and causing a gas containing oxygen to bubble through the mixture, the process being conducted at atmospheric pressure, a temperature of from 60° C. to the boiling point of the mixture, and a pH of from 2 to 4.

2. The method in accordance with claim 1 in which the gas containing the oxygen is air.

3. The method in accordance with claim 1 in which the oxygenated compound contains lead, and the chloride solution contains at least 3 gm-equivalents per liter of chloride ions.

4. The method in accordance with claim 3 in which chloride ions are introduced in the form of a chloride of an alkali or alkaline-earth metal.

5. The method in accordance with claim 1 in which the solution resulting from the action of said ferrous chloride solution is brought into contact with iron in a metallic state, and the non-ferrous metals that are less electro-positive than iron and which are precipitated in that way, are recovered.

6. The method in accordance with claim 5 in which the solution resulting from said establishment of a contact with a compound containing iron is recycled back to the dissolving step.

7. The method in accordance with claim 1 in which the non-ferrous metal is lead and the reaction is carried out at a temperature of 85° C.

8. The method in accordance with claim 1 in which the non-ferrous metals are lead and zinc, the reaction is carried out at a temperature of 80° C. and at a pH of 2.6, and the solution comprises 250 g/l of sodium chloride and 20 g/l of iron in the form of ferrous chloride.

9. The method in accordance with claim 1 in which the non-ferrous metal is lead; the solution comprises 20 g/l of iron in the form of ferrous chloride and 250 g/l of sodium chloride; and the reaction is carried out at a temperature of 80° C.

10. The method in accordance with claim 1 in which the non-ferrous metals are lead and zinc, the solution comprises 250 g/l of sodium chloride and 40 g/l of ferrous chloride, and the reaction is carried out at a temperature of 80° C.

11. The process in accordance with claim 1 in which the oxygenated compound is selected from the group consisting of oxides, hydroxides, carbonates, and basic carbonates.

* * * * *